Patented Dec. 22, 1953

2,663,672

UNITED STATES PATENT OFFICE 2,663,672

PRODUCTION OF ASPHALT

Charles A. Kraus, Providence, R. I., and David W. Young, Westfield, N. J., assignors to Standard Oil Development Company, a corporation of Delaware No Drawing. Application April 1, 1952, Serial No. 279,916

5 Claims. (Cl. 196—22)

This invention concerns a process for the manufacture of asphalts from petroleum crude oil or from the distillation residue of petroleum oils. The invention concerns the treatment of such residual oils with silicon halide compounds such as silicon tetrachloride. In this process the silicon halide compound serves to upgrade the residual oil to an asphalt composition having desirable properties for many applications of asphalts.

It is well known that asphalts may be recovered from residual petroleum oils by a variety of processing techniques. Reduction processes may be employed to remove the more volatile constituents of the residual oil and to leave an asphaltic material as a product, for example. Again, residual oils may be subjected to oxidation treatments, as by air blowing for example, in order to convert residual oils to asphalts. As used herein, the term "residual oil" is employed to identify the liquid or semi-solid residues obtained from the destructive distillation of non-asphaltic petroleum from the distillation of semi-asphaltic and asphaltic petroleums, from the distillation of pressure tar, or from the fluxing of harder residual asphalts with heavy distillates. For example, a residual oil may be obtained from a conventional vacuum distillation zone for crude oil. In such a distillation system, normally gaseous hydrocarbons are withdrawn as an overhead product while side stream products consisting of gasoline, kerosene, gas oil, lubricating oil, etc., may be obtained. Residual oil is recovered as a bottoms product from such a distillation system and is characterized by a specific gravity of about 0.85 to 1.07 at 77° F. Normally such a residual oil will have a fusing point as determined by the ring and ball method, falling within the range of about 32° to 120° F.

The properties of asphalts recovered from residual oils of this character depend upon the processing of the residual oil. Thus, for example, in the case of the conventional processes hereinbefore referred to, depending upon the extent of treatment, asphalts are obtained having a range of softening points, ductilities and other asphalt properties characteristic of the treatment applied. In the specific case of air blowing, for example, it is possible to obtain asphalts having what are classed as high melting points; that is, above 200° F. or higher, accompanied by low values of penetration and low values of ductility. It is one object of this invention to provide a novel method of processing residual oils to obtain asphalts having a combination of properties different from those obtained by processes heretofore used. This objective is fulfilled in accordance with this invention in a simple effective manner by employing silicon tetrachloride or the like as a treating agent.

It is a characteristic of processes heretofore known for the upgrading of residual oils to asphalts that in accordance with the increase in the melting point of the asphalts achieved, ductility values of the final asphalt products are lost. In this connection, for example, while a residual oil can be converted to an asphalt of high softening point by air blowing or other oxidation treatment, the asphalts obtained thereby are characterized by extremely low values of ductility. It is therefore a more specific object of this invention to provide an asphalt production process in which asphalts of high melting point may be obtained having higher ductilities than those obtainable by oxidative treatments.

In accordance with the present invention it has been found that the melting points of residual oils and petroleum asphalts may be raised by a simple and inexpensive treatment with silicon tetrachloride. The temperature to be employed for this treatment is generally in the range of about 200° to 600° F. Lower temperatures may be employed by extending the reaction time. At temperatures within the range indicated, it is necessary to treat the residual oil with silicon tetrachloride for a period of about one-half hour to two hours or more. Comparatively little silicon tetrachloride is required to appreciate a substantial change in the properties of the residual oil. Thus, less than 5% of the silicon tetrachloride is generally to be employed and preferably about 2 to 4% of the treating agent is to be used. Treatment of the residual oil with the silicon tetrachloride is carried out by admixture of these materials, preferably in a vessel under reflux or in a closed vessel under superatmospheric pressure. The pressure to be employed during reaction has not been found to be critical so that atmospheric pressures or higher pressures may be employed if desired.

The silicon tetrachloride used as a treating agent is a monomeric material. $SiCl_3H$ and $SiCl_2H_2$ may be employed if desired in place of the silicon tetrachloride. Again the analogous bromine and fluorine compounds of silicon may be employed. These compounds may be defined as halide substituted derivatives of $SiH_4$.

It has been established that silicon tetrachloride and the other compounds identified are apparently capable of reacting with constituents of residual oil so as to incorporate silicon to carbon bonding. It is contemplated that the reaction which occurs causes cross-linking of certain of the hydrocarbons present, resulting in the change of asphalt properties referred to. These new asphalts that are cross-linked with silicon have improved adhesion to metals.

As exemplary of the benefits obtained by the process of this invention, the following data is presented. This data was obtained by reacting about 2% of silicon tetrachloride with a residual oil for a period of one hour at 482° F., in a closed steel bomb. For comparative purposes an oxidized asphalt was also subjected to the treatment with silicon tetrachloride. The results of these experiments are shown in the following table:

TABLE I

|  | Residual Oil | | Oxidized Asphalt | |
|---|---|---|---|---|
| Percent $SiCl_4$ used | None | 2.0 | None | 2.0 |
| Softening Pt., °F | 118 | 161 | 244 | 290+ |
| Ductility at 77° F | 100+ | 7 | 1.0 | 0.5 |
| Penetration at 77° F | 79 | 32 | 5 | 5 |
| Penetration at 32° F | 28 | 16 | 5 | 4 |
| Penetration at 115° F | 100+ | 74 | 10 | 9 |

It will be observed from this table that the original residual oil treated had a softening point of about 118° F. After the indicated treatment with silicon tetrachloride an asphalt was obtained having a softening point of 161° F. This asphalt had reasonably good properties of ductility as indicated by the value of 7 for the ductility at 77° F. For comparative purposes it will be observed from column 3 that an oxidized asphalt generally has poor properties of ductility as indicated by the value of 1. As indicated, it is one of the principal advantages of this invention to provide an asphalt having higher ductility values than obtainable by comparable treatment of residual oil in an oxidation process.

The data in columns 3 and 4 of the table show that the silicon tetrachloride treatment can be employed to increase the softening point of an asphalt even though obtained by other processes. Thus, in these experiments, an oxidized asphalt having a softening point of 244° F. was subjected to treatment with silicon tetrachloride. The result of this treatment was an asphalt product having a softening point above 290° F., showing a substantial increase in the softening point of this asphalt. This unusually high softening point asphalt was obtained without any substantial change in the other properties of the asphalt.

Additional experiments were conducted in which an asphalt was treated with silicon tetrachloride under reflux conditions at 450° F. for one hour. Thus, the pressure maintained during treatment of the asphalt was atmospheric pressure employing reflux to prevent escape of the silicon tetrachloride. The results of these experiments are shown in Table II:

TABLE II

| Percent $SiCl_4$ | 77° F. Ductility | Softening Point or Melting Point by Ring and Ball Method |
|---|---|---|
| Blank | 100+ | 118 |
| 1 | 100+ | 144 |
| 2 | 100+ | 172 |
| 3 | 88 | 175 |
| 5 | 31 | 180 |
| 100 | 0 | (¹) |

¹ Coke-like product.

It will be observed from the data of Table II that the increase in the softening point of the asphalt was proportional to the amount of silicon tetrachloride employed. However, even when as little as 1% of silicon tetrachloride was used, an appreciable increase in the softening point of the asphalt was obtained. Again it will be noted that the ductility properties of the asphalt are not substantially affected unless a large amount of silicon tetrachloride is employed. Thus, the final asphalt product obtained, even when 5% of silicon tetrachloride is used, still has a desirably high ductility.

The asphalts obtained by the process of this invention possess softening point, penetration and ductility properties, characterizing these asphalts as particularly desirable for laminating purposes. In this use the asphalts are of particular interest by virtue of low oil bleeding and staining characteristics.

What is claimed is:

1. The method of increasing the melting point of an asphaltic material which comprises admixing said asphaltic material with silicon tetrachloride and heating said mixture to temperatures of about 200° to 600° F. for a period longer than about one-half hour.

2. The process defined by claim 1 in which said heating is conducted at superatmospheric pressures.

3. The process defined by claim 1 in which the said heating is conducted under reflux conditions.

4. The method of upgrading an asphalt material which comprises reacting the said asphaltic material with a halide derivative of $SiH_4$ at a temperature of about 200 to 600° F. for a period longer than about one-half hour.

5. The process defined by claim 4 in which the said halide derivative of $SiH_4$ is selected from the group consisting of $SiCl_2H_2$, $SiCl_3H$, and $SiCl_4$.

CHARLES A. KRAUS.
DAVID W. YOUNG.

References Cited in the file of this patent

UNITED STATES PATENTS

| Number | Name | Date |
|---|---|---|
| 2,585,119 | Hanson et al. | Feb. 12, 1952 |

OTHER REFERENCES

Chimica (Milan), vol. 2, pages 315-20 (1947) (Cianetti) (Abstracted in Chem. Abstracts, vol. 42 (1948), p. 9142f).